April 26, 1927.
A. F. DICE
FISHING DEVICE
Filed March 17, 1924
1,625,988
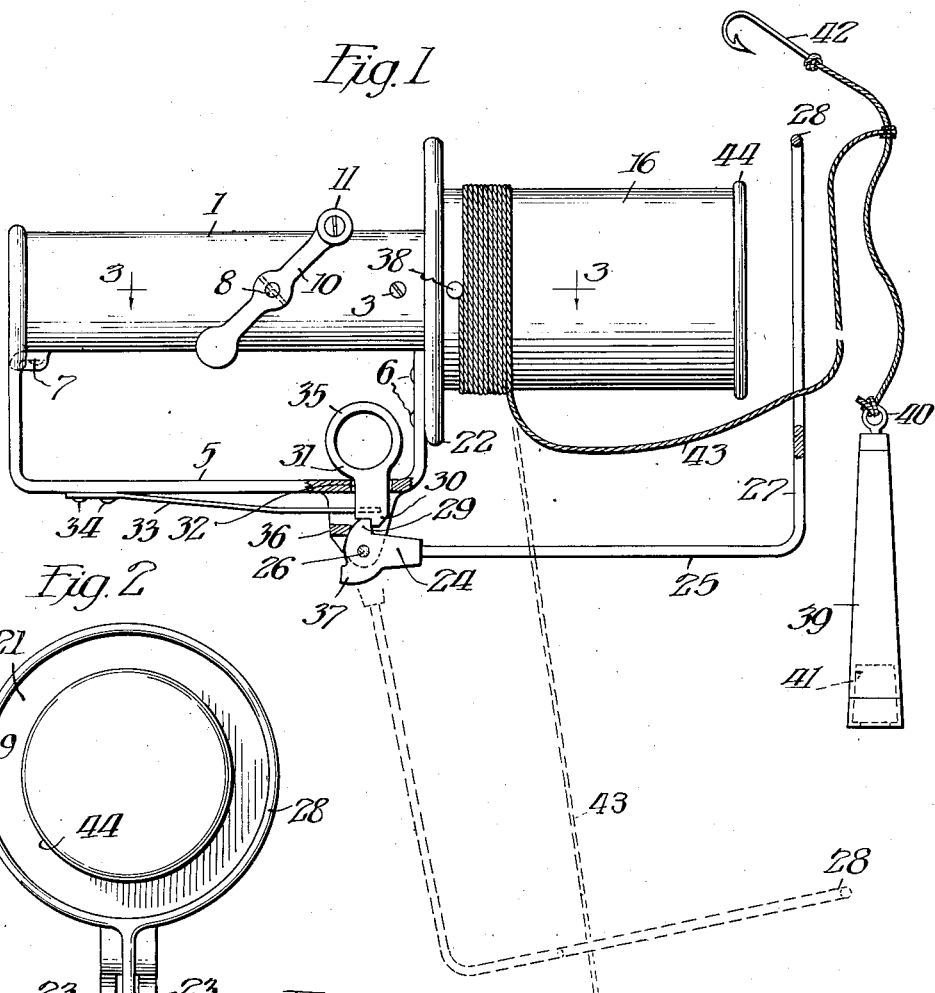
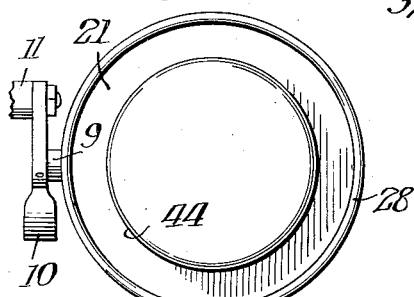
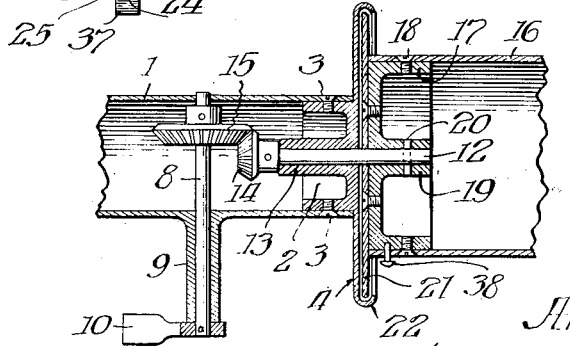
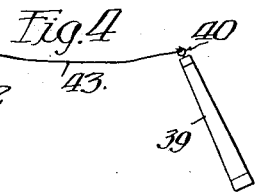
Inventor:
Andrew F. Dice,
By Fisher, Lowh, Clapp & Soans.
Attys.

Patented Apr. 26, 1927.

1,625,988

UNITED STATES PATENT OFFICE.

ANDREW F. DICE, OF JOLIET, ILLINOIS, ASSIGNOR OF ONE-THIRD TO GEORGE DICE AND ONE-THIRD TO MINNIE DICE, BOTH OF JOLIET, ILLINOIS.

FISHING DEVICE.

Application filed March 17, 1924. Serial No. 699,676.

My invention relates more particularly to a device for paying out and reeling in the fishing line in casting, and also comprises a weighted attachment for the end of the line.

The principal objects of my invention are to provide a device for casting which does not require a pole or rod; to pay out the line without resistance or interference; to arrange the reel on which the line is wound so that the line feeds off the end of the reel in casting without necessitating rotation of the reel; to wind the line on the reel so that it will readily feed off of the end of the reel when the cast is made; to provide an improved weighted attachment for the end of the line; to hold the hook at an elevation above the bottom of the body of water so that it swings freely and does not catch on vegetation or other impediments at the bottom of the body of water; and in general, to provide a simple, compact and efficient device for casting.

On the drawings:

Fig. 1 is a side view of a fishing device constructed in accordance with my invention;

Fig. 2 an end view thereof;

Fig. 3 a fragmentary sectional view on the line 3—3 of Fig. 1; and

Fig. 4 a view showing the manner in which the weighted attachment at the end of the line operates to hold the hook above the bottom of the body of water.

Referring to the drawings, the reference numeral 1 indicates the handle of the device, which is in the form of a tube and has a plug 2 secured in the inner end thereof by screws 3. A circular disk 4 is formed integral or secured to the plug 2, and a guard 5 has one end inturned and secured to the rear face of the disk 4 by rivets 6 or other suitable means, while the other end of the guard 5 is likewise inturned and secured to the opposite end of the handle 1 as indicated at 7.

A shaft 8 extends diametrically through the tube 1, being journaled in an aperture in one side of the tube and an extended bearing 9 on the opposite side of the tube, and is provided with a crank 10 at the outer end having a handle 11 for turning the shaft.

A shaft 12 is journaled in a center bearing of the plug 2 and has a bevel pinion 14 on the inner end meshing with a bevel gear 15 on the shaft 8. The other end of the shaft 12, which projects out through the plug 2, supports the reel 16, which is of tubular form and preferably closed at the outer end. The inner end of this tube is secured to a large plug 17 by screws 18 which are preferably countersunk in the reel 16, and this plug has a central hub 19 which is secured to the shaft 12 by the pin 20.

A circular disk 21, which may be integral with the plug 17 or attached thereto as shown, is arranged close to the outer face of the disk 4, the marginal edge of the latter being turned over to loosely embrace the edge of the disk 21 as indicated at 22.

The guard 5 is formed near the outer end with a lateral projection consisting of a pair of spaced plates 23, between which the head 24 of a wire frame 25 is pivoted on the pin 26. This wire frame is formed at the outer end with an upturned portion 27 terminating in a wire loop 28 of somewhat greater diameter than the reel 16 and adapted to swing to a position shown in Fig. 1, beyond the end of the reel 16 and concentric with the latter as shown in Fig. 2. This wire frame 25 also swings radially or laterally outwardly to the position shown by dotted lines in Fig. 1 to serve as a guide for winding the line onto the reel 16.

For holding the frame 25 in the position shown in Fig. 1, the head 24 is formed with a lateral projection 29 having a shoulder which is adapted to interlock with a shoulder 30 on the lower end of a trigger 31, which latter slides through an aperture 32 in the guard 5, and is normally held in the extended position by a spring 33 which has one end secured to the guard 5 as indicated at 34, and the other end inserted in an aperture in the outer end of the trigger 31. This trigger 31 has a loop 35 at the inner end which may be conveniently engaged by the finger of the hand, as the latter grasps the handle 1, and retracted thereby, so as to release the shoulder or projection 29 from the shoulder 30, for permitting the wire frame 25 to swing to the dotted line position of Fig. 1.

To limit the swinging movement of the frame 25, the plates 23 are formed with a cross rib 36, against which the rear edge of the projection 29 comes in contact when the frame 25 is swung to the position of Fig. 1, and the trigger 31 interlocked with the head 24, and this head is also provided with a lug 37 which comes in contact with the back of this rib 36 when the frame is swung to the dotted line position, and serves to limit the movement of the frame 25 when the latter is released by the trigger 31.

In using this device, the end of the line is attached to the inner end of the reel 16, a pin 38 or other suitable fastening device being provided for this purpose, and the line is led out through the loop 28 and has the weighted attachment 39 connected to the outer end. This attachment is preferably an elongated piece of wood or other buoyant material, and is provided with an eye 40 at the upper end, to which the line is attached. The lower end of this stick is formed with a recess 41 filled with lead or other material which will cause the float to sink. The attachment 39 however, maintains a substantially upright position at the bottom of the body of water owing to the buoyancy of the stick. The hook 42 is connected to the line 43 at a short distance from the attachment 39 as shown.

In the operation of the device, the line is wound on the reel 16 by turning the crank 10. The handle 1 is grasped in a suitable manner for throwing, and a portion of the line between the guide 28 and reel 16 is held in the other hand with the weight 39 and hook 42 hanging from the loop or guide 28. The operator then gives to the device a throwing motion and at the same time releases the slack between the guide 28 and reel 16 which he has been holding. The weight 39 and hook 42 are thus cast away from the operator and dropped into the water at a distance away, whereupon the weighted float or stick 39 assumes a substantially upright position at the bottom of the stream or body of water, with the hook 42 hanging from the line a short distance away from the weight 39. The trigger 35 is then withdrawn from engagement with the head 24 of the wire frame, which allows the latter to drop to the position indicated by dotted lines in Fig. 1. The handle 1 and reel 16 are then held in an upright position, and the crank 10 turned so as to wind the line 43 onto the reel 16, the guide 28 serving at such time to direct the line properly onto the reel. By tilting the handle 1 and reel 16 more or less, the winding of the line on the reel may be readily controlled so that the line is properly distributed throughout the length of the reel. The outer end of the reel may be made plain if desired, but I prefer to form same with a small annular bead 44 at the outer end to prevent the line from accidentally slipping off of the end of the reel except at the time of casting.

As the line is reeled in, the stick 39, on account of its buoyancy and the arrangement of the weight 41 at the lower end, has a tendency to maintain the upright position and drags along the bottom of the stream or body of water in somewhat the manner shown in Fig. 4, thereby holding the hook 42 in a more or less elevated position and prevent entanglement thereof with vegetation or other impediments in the bed of the stream.

When the line has been sufficiently reeled in, the frame 25 is thrown up to the position shown in full lines in Figs. 1 and 2, whereupon the device is ready for casting again in the manner heretofore described.

It will be noted that no pole is employed in connection with this device, and is in a neat compact form so that it is handy to carry around. Moreover, it has been found that with this device a longer cast can be made, owing to the fact that there is practically no resistance to the paying out of the line, as is the case with reels of the ordinary form and poles wherein the line is required to run through a series of guide eyelets, and it has also been found that the hook and weight can be cast more accurately at any point where it is desired to drop same into the water.

While I have shown and described my invention in a preferred form, I am aware that various changes and modifications may be made without departing from the principles of my invention, the scope of which is to be determined by the appended claims.

I claim as my invention:

1. In a rodless fishing device, the combination of a handle, a reel extending forwardly from the handle in axial alinement therewith, mechanism for rotating the reel, and a guide for feeding the line on to the reel in a direction transverse to the axis of the handle and swingable laterally toward and away from the same in line with the axis thereof.

2. In a rodless fishing device, the combination of a handle providing only a hand grip, a reel mounted to rotate on the handle, the handle and reel being rotatably connected and having interfitted disks, mechanism for rotating the reel, and a guide mounted on the handle and movable to positions at the end of the reel and at the side of the reel.

3. In a rodless fishing device, the combination of a short handle, a reel mounted to rotate on said handle with its axis extending axially of the handle, a crank for rotating the reel, and a guide pivotally mounted to swing to a position at the end of the reel and to a position at the side of the reel.

4. In a fishing device, the combination of a handle, a reel journaled to rotate at the end of the handle and projecting therebeyond, a crank for rotating the reel, a bracket extending laterally from the handle adjacent the inner end of the latter, a guide pivoted on the bracket so as to swing to a position at the end of the reel and to a position at the side of the reel, and a latch for holding the guide in the adjusted position.

5. In a fishing device, the combination of a handle, a reel journaled at the inner end of and in alignment with the handle and projecting beyond the inner end of the handle, mechanism for rotating the reel, and a guide movable to a position at the end of the reel for guiding the line from the reel and movable to a position at the side of the reel for directing the line onto the reel in winding.

6. In a rodless fishing device, the combination of a handle, a reel journaled at one end of the handle, a disk interposed between the handle and the reel, a crank at one side of the handle and having operative axial connection with the reel for rotating the reel, and a guide movable to a position at the end of the reel and laterally to a position at the side of the reel.

7. In a fishing device, the combination of a handle, a reel rotatably mounted on the end of the handle, gearing within the handle inwardly of the reel for rotating the reel leaving the front of the reel unobstructed, a crank at the side of the handle for operating the gearing, and a swingable guide at the side of the reel for feeding the line sidewise onto the reel.

8. In a fishing device, the combination of a reel having a line wound therearound, a handle for manipulating the reel so as to cast the line therefrom, and a weighted attachment on the end of the line comprising an elongated buoyant member having the line attached at one end thereof and having a weight in the other end thereof so that said member maintains a substantially upright position when submerged in the water.

9. In a fishing device, a handle, a reel mounted to rotate on the handle and having a common axis, the handle and reel having interfitting disks at adjacent ends placed face-wise to each other permitting rotation of the reel with respect to the handle, and means carried by the handle and rotatably connecting the reel to the handle for rotating the reel.

10. In a fishing device, a handle, a reel extending forwardly from the handle and connected for independent rotation at abutting ends, and means carried by the handle inwardly of the reel to actuate the latter, said means serving as a connection between the handle and the reel.

11. In a fishing device, a handle, a reel mounted to rotate on the handle, the handle having a disk with its marginal edge turned over, the reel having a disk embraced by the turned-over edge of the first disk, and mechanism for rotating the reel and including a connection between the handle and reel.

12. In a fishing device, a handle, a reel mounted to rotate on the handle, the one having a disk with its marginal edge turned over, the other having a disk embraced by the turned-over edge of the first disk, and mechanism for rotating the reel and operatively connecting the same to the handle, said mechanism having an operating member at one side of the handle.

13. In a fishing device, a handle, a reel mounted to rotate on the handle, the handle having a disk with its marginal edge turned over, the reel having a disk embraced by the turned-over edge of the first disk, means for rotating the reel and operatively connecting the same to the handle, said means having an operating member at one side of the handle, a guard on the handle, and a guide carried by the guard and swingable to positions beyond the end of the reel and at one side thereof, as and for the purposes described.

14. In a fishing device, the combination of a handle, a reel mounted to rotate on said handle and having an axis common with that of the handle, a crank for rotating the reel, and a guide pivotally mounted to swing to a position at the end of the reel and to a position at the side of the reel and having a guide loop larger than the reel.

15. In a fishing device, the combination of a handle, a reel journaled at the inner end of and in alignment with the handle and projecting beyond the inner end of the handle, mechanism including a crank handle projecting laterally from the handle between its ends and geared to the reel, and a guide movable to a position at the end of the reel for guiding the line from the reel and movable to a position at the side of the reel for directing the line onto the reel in winding.

16. In a fishing device, the combination of a handle, a reel journaled to rotate at the end of the handle and projecting therebeyond, means for rotating the reel, a bracket extending laterally from the handle, a guide pivoted on the bracket so as to swing to a position at the end of the reel and to a position at the side of the reel, and means for holding the guide in the adjusted position.

ANDREW F. DICE.